US012658586B2

(12) United States Patent
Ohmae et al.

(10) Patent No.: US 12,658,586 B2
(45) Date of Patent: Jun. 16, 2026

(54) FERRITE SHEET, AND ANTENNA APPARATUS AND NON-CONTACT POWER SUPPLY APPARATUS USING SAME

(71) Applicant: TODA KOGYO CORP., Hiroshima (JP)

(72) Inventors: Satoshi Ohmae, Otake (JP); Tetsuya Kimura, Otake (JP); Akihiro Ohashi, Otake (JP)

(73) Assignee: TODA KOGYO CORP., Hiroshimashi (JP)

( * ) Notice: Subject to any disclaimer, the term of this patent is extended or adjusted under 35 U.S.C. 154(b) by 130 days.

(21) Appl. No.: 18/686,603

(22) PCT Filed: Aug. 15, 2022

(86) PCT No.: PCT/JP2022/030879
§ 371 (c)(1),
(2) Date: Feb. 26, 2024

(87) PCT Pub. No.: WO2023/026890
PCT Pub. Date: Mar. 2, 2023

(65) Prior Publication Data
US 2024/0243476 A1 Jul. 18, 2024

(30) Foreign Application Priority Data
Aug. 26, 2021 (JP) ................................ 2021-138205

(51) Int. Cl.
*H01Q 7/06* (2006.01)
*H01F 1/34* (2006.01)
*H01F 38/14* (2006.01)

(52) U.S. Cl.
CPC ................. *H01Q 7/06* (2013.01); *H01F 1/34* (2013.01); *H01F 38/14* (2013.01)

(58) Field of Classification Search
CPC .......... H01F 1/34; H01F 1/344; H01F 27/366; H01F 38/14; H01Q 7/06; H01Q 7/08; H02J 50/005; H02J 50/10; H02J 50/70
See application file for complete search history.

(56) References Cited

U.S. PATENT DOCUMENTS 9,640,304 B2 * 5/2017 Yoo ......................... B32B 18/00
9,641,304 B2 * 5/2017 Marinier ............... H04L 5/0053
(Continued)

FOREIGN PATENT DOCUMENTS

JP 2005-015293 A 1/2005
JP 2007-123373 A 5/2007
(Continued)

OTHER PUBLICATIONS

Extended European Search Report dated Jul. 24, 2025 for European Application No. 22861179.4, in 9 pages.
(Continued)

*Primary Examiner* — Thien M Le
(74) *Attorney, Agent, or Firm* — Knobbe, Martens, Olson & Bear, LLP

(57) ABSTRACT

A ferrite sheet includes a substrate, a sintered ferrite plate provided on a surface of the substrate via an adhesive layer, and a protective layer provided on a surface of the sintered ferrite plate. The protective layer includes at least one groove that extends to at least the sintered ferrite plate and does not extend to a surface of the substrate that is not in contact with the adhesive layer.

7 Claims, 2 Drawing Sheets

(56) References Cited

U.S. PATENT DOCUMENTS

| | | | | |
|---|---|---|---|---|
| 10,578,049 | B2 * | 3/2020 | Wagenblast | B23K 26/0006 |
| 11,192,184 | B2 * | 12/2021 | Poenitzsch | C23C 28/02 |
| 11,784,502 | B2 * | 10/2023 | Yeom | H02J 50/12<br>320/108 |
| 2009/0117328 | A1 | 5/2009 | Kawai et al. | |
| 2012/0088070 | A1 * | 4/2012 | Nishi | C04B 35/2633<br>428/141 |
| 2014/0083758 | A1 * | 3/2014 | Park | H05K 9/0075<br>156/60 |
| 2014/0134401 | A1 | 5/2014 | Park et al. | |
| 2015/0180128 | A1 * | 6/2015 | Ishikura | H01Q 1/2225<br>343/788 |
| 2015/0349424 | A1 | 12/2015 | Hur et al. | |
| 2019/0044391 | A1 * | 2/2019 | Jang | H01F 38/14 |
| 2019/0148988 | A1 | 5/2019 | Hwang et al. | |
| 2019/0363030 | A1 | 11/2019 | Yazaki et al. | |
| 2022/0237334 | A1 * | 7/2022 | Gaine | G06F 21/87 |

FOREIGN PATENT DOCUMENTS

| | | | |
|---|---|---|---|
| JP | 2008-124197 | A | 5/2008 |
| JP | 2008-296431 | A | 12/2008 |
| JP | 2009-113370 | A | 5/2009 |
| JP | 2016-076645 | A | 5/2016 |
| JP | 2020-083731 | A | 6/2020 |
| TW | 201423778 | A | 6/2014 |
| WO | WO 2006/129704 | A1 | 12/2006 |
| WO | WO 2018/155162 | A1 | 8/2018 |

OTHER PUBLICATIONS

International Search Report mailed Nov. 1, 2022 in International Application No. PCT/JP2022/030879, in 5 pages.

Office Action dated Nov. 1, 2025 for Korean Patent Application No. 10-2024-7009004, in 10 pages.

Office Action issued in corresponding Taiwanese Patent Application No. 111131500, dated Dec. 2, 2025, in 8 pages.

* cited by examiner

FERRITE SHEET, AND ANTENNA APPARATUS AND NON-CONTACT POWER SUPPLY APPARATUS USING SAME

PRIORITY AND CROSS REFERENCE TO RELATED APPLICATIONS

This application is the U.S. National Stage Application under 35 U.S.C. § 371 of International Application No. PCT/JP2022/030879, filed Aug. 15, 2022, designating the U.S. and published as WO 2023/026890 A1 on Mar. 2, 2023, which claims the benefit of Japanese Patent Application No. JP 2021-138205, filed Aug. 26, 2021. Any and all applications for which a foreign or a domestic priority is claimed is/are identified in the Application Data Sheet filed herewith and is/are hereby incorporated by reference in their entirety under 37 C.F.R. § 1.57.

TECHNICAL FIELD

The present disclosure relates to a ferrite sheet, and an antenna apparatus and a non-contact power supply apparatus using the ferrite sheet, and particularly relates to an easily bendable ferrite sheet, and an antenna apparatus and a non-contact power supply apparatus using such ferrite sheet.

BACKGROUND ART

Conventionally, a method is widely employed, which includes forming a spiral-shaped loop coil in a plane and arranging a soft magnetic sheet made of a sheet-shaped soft magnetic material between the coil and a metal member around the coil, such as a circuit board and a battery, in order to improve communication characteristics of an antenna and charging efficiency of a non-contact power supply apparatus. An example of such soft magnetic sheets is a ferrite sheet using ferrite. By arranging the ferrite sheet between the coil and the metal member, the magnetic flux that is generated by the coil can be collected into the ferrite sheet and the interference with metal can be reduced, so that the communication characteristics of an antenna and the charging efficiency of a non-contact power supply apparatus can be improved.

While having high magnetic permeability, such ferrite sheet is generally hard and brittle, thus very susceptible to mechanical stress, and has a problem of easily cracking upon applying a small impact. In this regard, for example, Patent literature 1 suggests a ferrite sheet in which a sintered ferrite body is pre-singulated to provide flexibility. Specifically, in Patent literature 1, the ferrite sheet having a plurality of ferrite bits is formed by sandwiching a thin sintered ferrite sheet between first and second coating layers, in which the ferrite sheet has a plurality of grid-shaped splitting grooves extending in longitudinal and lateral directions on at least one of front and rear faces, and by thereafter cracking it along the splitting grooves (see FIG. 1 in Patent literature 1). This can result in good magnetic properties and impart flexibility against, for example, bending and deflection.

Patent literature 2 discloses a ferrite sheet in which a sintered ferrite body formed in a thin plate shape is split into a plurality of ferrite pieces by applying external force to the sintered ferrite body for forming irregular cracks.

CITATION LIST

Patent Literature

[Patent Literature 1] Japanese Laid-Open Patent Publication No. 2008-124197

[Patent Literature 2] Japanese Laid-Open Patent Publication No. 2009-113370

SUMMARY OF INVENTION

Technical Problem

In recent years, in terms of ease of handling by users the ferrite sheet such as described above, flexibility that allows the sheet to conform complex shapes of an antenna and a metal member is highly desired. For example, there is an increasing demand for a ferrite sheet that can be bent at a generally right angle when in use, so that the sheet can be provided in a metal member, e.g. battery, across a corner portion where two faces are connected orthogonally to each other.

On the other hand, in the cases of the ferrite sheets as described in Patent literatures 1 and 2, the ferrite sheets have flexibility due to their structure of pre-split pieces, but may have, when being bent at a generally right angle, a so-called R(round)-shape that is bent and curved along the surfaces of the plurality of the split ferrite pieces. For that reason, for example, when the ferrite sheets as described in Patent literatures 1 and 2 are each disposed across two faces of a metal member connected orthogonally to each other, a gap is created between the ferrite sheet and the metal member in a corner portion serving as a connecting portion of the two faces. Thus, when the ferrite sheet is used affixed to an antenna substrate having an antenna coil, the gap created makes it difficult to collect magnetic flux generated by the coil into the ferrite sheet, which may result in an inability to ensure good communication characteristics of the antenna. Also, when bending the ferrite sheet, unintended cracks may also be produced in the sintered ferrite plate, and depending on how it is cracked, an excessive gap may be created between adjacent ferrite pieces. As a result, the continuity of the sintered ferrite plate may be lost to reduce magnetic permeability of the ferrite sheet, thereby resulting in degrading the communication characteristics of the antenna and the charging efficiency of the non-contact power supply apparatus.

The present disclosure is made in view of the aforementioned problem, and an object of the present disclosure is to ease bending of a ferrite sheet at a desired position into a desired shape and to reduce its decrease in magnetic permeability caused by unintended cracks during bending.

Solution to Problem

To achieve the object, a ferrite sheet according to the present disclosure includes a groove for bending the ferrite sheet, wherein the groove is formed in a surface of a protective layer provided on a surface of a sintered ferrite plate, and the groove reaches to the sintered ferrite plate.

Specifically, the ferrite sheet according to the present disclosure includes a substrate; a sintered ferrite plate provided on a surface of the substrate via an adhesive layer; and a protective layer provided on a surface of the sintered ferrite plate, wherein the protective layer includes at least one groove that extends to at least the sintered ferrite plate and does not extend to a face of the substrate not being in contact with the adhesive layer.

In the ferrite sheet according to the present disclosure, the provided at least one groove that extends from the protective layer to at least the sintered ferrite plate and does not extend to the face of the substrate not being in contact with the adhesive layer, allows easy bending of the ferrite sheet into a desired shape by using the groove as a starting point. Thus, for example, when the ferrite sheet is disposed in a corner portion of a metal member, more particularly, disposed across two faces of the metal member connected orthogonally to each other, the ferrite sheet can be bent to follow a shape of the corner portion in which the two faces are connected, and thus a gap is less likely to be created between the ferrite sheet and the metal member. When the ferrite sheet is used affixed to an antenna substrate having an antenna coil, magnetic flux generated by the coil thus can be effectively concentrated in the ferrite sheet, which can as a result ensure good communication characteristics. Further, the ferrite sheet according to the present disclosure can be appropriately bent at a desired position by bending it using the groove as the starting point since the groove is provided into the sintered ferrite plate, and thus an occurrence of unintended cracks can be prevented. Thereby, the decrease in magnetic permeability caused by unintended cracks after bending the ferrite sheet can be reduced to ensure good communication characteristics of an antenna and good charging efficiency of a non-contact power supply apparatus. The groove then does not extend to the face of the substrate not being in contact with the adhesive layer, thus a separation of the ferrite sheet due to the groove can be prevented.

In the ferrite sheet according to the present disclosure, the groove preferably extends to at least one third of the thickness direction of the sintered ferrite plate.

In this way, the accuracy of the bending position and the ease of the bending the ferrite sheet can be improved.

The ferrite sheet according to the present disclosure may be a ferrite sheet bent by using the groove as the starting point.

In that case, a portion bent by using the groove as the starting point may also be bent at a generally right angle.

Such ferrite sheet bent by using the groove as the starting point can be disposed to tightly fit to, for example, a corner of the metal member, as described above. Thus, when the ferrite sheet is applied to the antenna apparatus as described above, the magnetic flux generated by the coil can be effectively concentrated in the ferrite sheet.

Another subject of the present disclosure is an antenna apparatus including any of the foregoing ferrite sheet, and a coil provided on a surface of the ferrite sheet and including a conductive material.

Such antenna apparatus includes the ferrite sheet according to the present disclosure, and thus can be easily bent at a generally right angle and also reduce the decrease in magnetic permeability during bending the ferrite sheet to thereby ensure good communication characteristics.

Another subject of the present disclosure is then a non-contact power supply apparatus including any of the foregoing ferrite sheet, and a coil provided on a surface of the ferrite sheet and including a conductive material.

Such non-contact power supply apparatus includes the ferrite sheet according to the present disclosure, and thus can effectively concentrate the magnetic flux generated by the coil into the ferrite sheet to thereby ensure good charging efficiency.

Advantageous Effects of Invention

In the ferrite sheet according to the present disclosure, the ferrite sheet can be easily bent at a generally right angle and reduce the decrease in magnetic permeability caused by unintended cracks in the sintered ferrite plate during bending the ferrite sheet.

DETAILED DESCRIPTION OF EMBODIMENTS

Embodiments of the present disclosure will be explained in the following with reference to the drawings. The following description of preferred embodiments is merely an example in nature, and is not intended to limit the present disclosure, application methods of the present disclosure, or use of the present disclosure.

Figure 1:
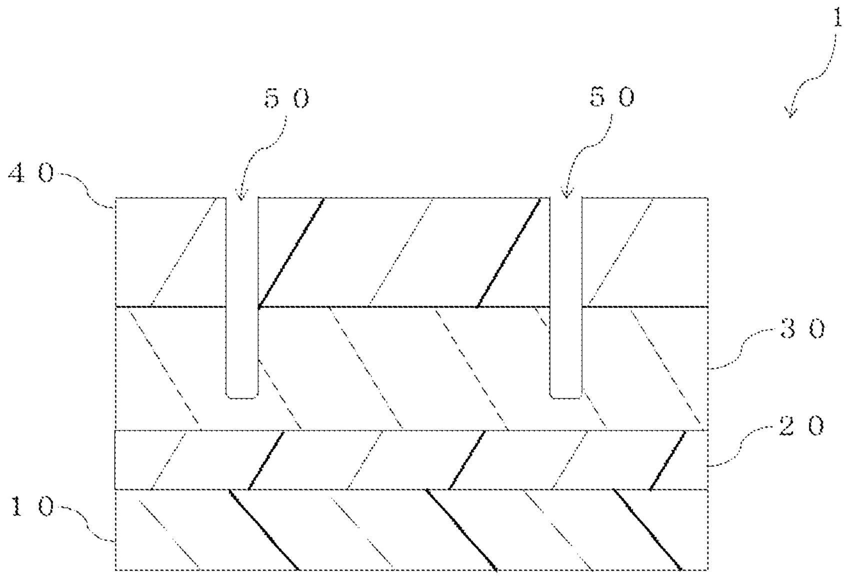
FIG. 1 is a cross-sectional view of a ferrite sheet according to an embodiment of the present disclosure.

A ferrite sheet according to an embodiment of the present disclosure will be firstly explained with reference to FIG. 1. As shown in FIG. 1, the ferrite sheet 1 according to the embodiment includes a substrate 10, a sintered ferrite plate 30 provided on a surface of the substrate 10 via an adhesive layer 20, and a protective layer 40 provided on a surface of the sintered ferrite plate 30. The protective layer 40 may be adhered to the sintered ferrite plate 30 via an adhesive material (not shown), such as a double coated tape, or the protective layer 40 may be by itself, for example, a resin tape including an adherent material. A groove 50 for bending the ferrite sheet 1 as will be explained is formed in the protective layer 40.

Materials of the substrate 10 and the protective layer 40 are not particularly limited as long as the material is a resin expandable and contractible without breaking when the ferrite sheet 1 is bent; however, for example, a resin material, such as polyethylene terephthalate (PET) can be used. The substrate 10 may also be a laminate, in which other layers are laminated on a resin substrate. In that case, for example, a conductive layer, a metal layer, and a composite magnetic sheet, in which magnetic powders are mixed with a resin, may be laminated on the resin substrate, such as PET, via an adhesive material.

The adhesive layer 20 is not particularly limited as long as the sintered ferrite plate 30 can be adhered to the substrate 10; however, for example, a double coated tape, in which an adhesive material is provided on both faces of a resin substrate, such as PET, can be used.

The sintered ferrite plate 30 is a sintered ferrite body formed as a plate. Types of the ferrite used are not particularly limited as long as it has magnetic properties; however, for example, Ni—Zn-based ferrite or Mn—Zn-based ferrite can be used. Methods for producing the sintered ferrite body are not particularly limited as well; however, for example, a method for coating a plastic film with a ferrite-dispersed coating material can be used. Specifically, the following method can be used.

First, a coating material is prepared by mixing 70 to 120 parts by weight of polyvinyl alcohol resin, 15 to 25 parts by weight of butyl butylphthalate as a plasticizer, and 400 to 600 parts by weight of solvent, with 1000 parts by weight of ferrite powder. For the solvent, for example, glycol ether-based solvents, methyl ethyl ketone (MEK), toluene, methanol, ethanol, and n-butanol can be used. In view of, for example, dispersibility of the ferrite powder and ease of mixing and drying, blending composition ranges preferable for the coating material are 80 to 110 parts by weight of polybutyral resin, 18 to 22 parts by weight of butyl butylphthalate, and 450 to 550 parts by weight of solvent, with respect to 1000 parts by weight of ferrite.

The coating material can be produced by using, for example, a ball mill, but is not limited to it. When the solvent and ferrite are first loaded and mixed and then the resin and plasticizer are added thereto and mixed, a uniform coating material can be obtained. It is important that the obtained coating material is sufficiently defoamed under reduced pressure in a vacuum vessel in order to prevent cracks from appearing in a coated film during coating and drying.

Methods for coating the ferrite-dispersed coating material are not particularly limited; and a roll coater and a doctor blade can be used. Doctor blades may be preferably used for better film thickness accuracy and coating stability. The coating material can be coated on a plastic film by means of a doctor blade to form a layer of a desired thickness and then dried at 80 to 130° C. for 30 to 60 minutes to obtain a formed ferrite sheet.

The plastic film on which the ferrite-dispersed coating material is to be coated is not particularly limited; and sandblasted films of polyethylene (PE), polypropylene (PP), polyethylene terephthalate (PET), polyimide film, etc., can be used. A polyethylene terephthalate (PET) film is preferable for processability of its film surface, and thermal stability during coating and drying. When a sandblasted plastic film is used, the unevenness of the plastic film can be transferred to the formed ferrite sheet to thereby obtain the formed sheet having a desired surface roughness.

Next, the obtained formed ferrite sheet is heat-treated to obtain the sintered ferrite plate 30. The heat treatment is performed on, for example, as many as 5 to 20 formed ferrite sheets stacked on an alumina plate having a porosity of 30%. Regarding heat treatment conditions, it is important to provide processes for removing resin components and growing ferrite particles by using an electric furnace or the like. The removal of resin components is performed under conditions of 150° C. to 550° C. for 5 to 80 hours, and the growth of ferrite particles is performed under conditions of 850° C. to 1200° C. for 1 to 5 hours. To prevent thermal deformation and cracking of the sheets, the removal of resin components may be performed at a temperature maintained constant after raised from a room temperature at a rate of as much as 10 to 20° C./hour. It is also preferred that the temperature is then raised at a rate of 30 to 60° C./hour and maintained constant to sufficiently sinter and grow the ferrite particles, followed by gradual cooling. In this regard, optimum conditions for the retention time and temperature in each process may be selected according to the number of the formed ferrite sheets to be treated. The sintered ferrite body can be obtained in the processes as described above. Thereafter, the sintered ferrite body is divided by means of, for example, a roller to form the sintered ferrite plate 30. Predetermined splitting grooves may be formed in the formed ferrite sheet in order to divide the sintered ferrite body into small pieces. The splitting grooves may be either continuous or intermittent, and may be replaced by forming many fine recesses. The sintered ferrite plate 30 is divided into triangular, quadrilateral, polygonal shapes of any size, or shapes obtained by combining thereof, by using the preformed grooves. A division into irregular shapes may be also performed without forming the splitting grooves.

Figure 2:
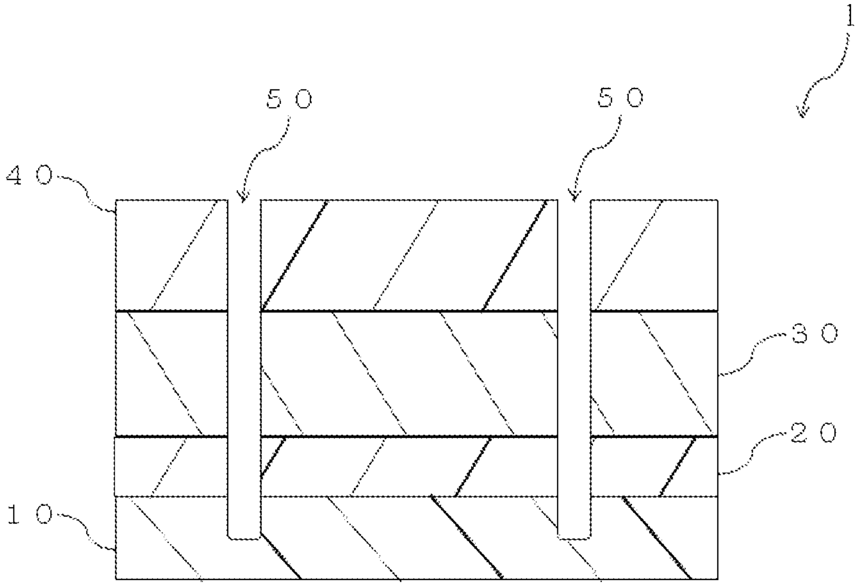
FIG. 2 is a cross-sectional view of a ferrite sheet according to a variant of an embodiment of the present disclosure.

In the ferrite sheet 1 according to the embodiment, the groove 50 for bending the ferrite sheet 1 as described above is formed linearly in a continuous way in the width direction of the ferrite sheet 1 in the face of the protective layer 40 opposite from the sintered ferrite plate 30. Particularly, the groove 50 is formed to extend from the face of the protective layer 40 opposite from the sintered ferrite plate 30, to the sintered ferrite plate 30. This allows the ferrite sheet 1 to be easily bent by using the groove 50 as a starting point, and also the reduction of unintended cracks produced in the sintered ferrite plate 30 during bending the ferrite sheet 1. The groove 50 is also formed up to a depth position at which it does not pass though the substrate 10. In other words, the groove 50 does not extend to a face of the substrate 10 that is not in contact with the adhesive layer 20. Thus, the groove 50 is not limited to being formed extending from the protective layer 40 to the sintered ferrite plate 30 as shown in FIG. 1, and, for example, as in a variant of the embodiment, may be formed reaching from the protective layer 40 to a part of the substrate 10 as shown in FIG. 2. Such arrangements can prevent the ferrite sheet 1 from being separated due to the groove 50. The embodiment provides two of the grooves 50 in the face of the protective layer 40 opposite from the sintered ferrite plate 30; however, not limited to this, and at least one or more grooves may be provided. Also, a groove passing through the substrate 10 may be provided separately of the groove 50 in a surface of the protective layer 40. Additionally, when the ferrite sheet 1 is bent, the groove 50 may be on an inner side or an outer side. In that case, a groove may be separately provided in the face of the substrate 10 that is not in contact with the adhesive layer 20 in order to improve bendability. That is, a groove extending upward from the bottom of the ferrite sheet 1 of FIGS. 1 and 2 may be separately provided. Methods for forming the groove 50 are not particularly limited as well; however, since the sintered ferrite plate 30 within the groove 50 is exposed, a method that causes less powder falling is preferred, for example, a laser processing apparatus can be used. When the groove 50 is formed by using a laser processing apparatus, adjustment to a desired width and depth is possible.

The groove 50 has a cross-sectional shape that is not particularly limited and that may be V-shaped or the like. The groove 50 is then provided linearly in a continuous way in the width direction of the ferrite sheet 1 in the face of the protective layer 40; however, the groove 50 is not particularly limited as long as the ferrite sheet 1 can be easily bent, and may be a groove in a curved line shape or a zigzag line shape, and may be a groove in a dashed line shape. The groove may also be instead formed in a form of many fine recesses. The groove 50 may have varying depths and a part of the groove may pass through the ferrite sheet 1.

As can be seen above, in the ferrite sheet according to the embodiment, with the groove provided in the protective layer as described above, the ferrite sheet can be easily bent into a desired shape by using the groove as the starting point. Thus, for example, when the ferrite sheet according to the embodiment is disposed along a corner portion of a metal member, a gap is less likely to be created between the ferrite sheet and the metal member. Thus, when the ferrite sheet is applied to an antenna apparatus, magnetic flux generated by a coil can be effectively concentrated in the ferrite sheet. When the ferrite sheet is then applied to a non-contact power supply apparatus, good charging efficiency can be ensured. Further, the ferrite sheet, when being bent, can be bent only at a desired position where the groove is provided, enabling prevention of unintended cracks from being produced in the sintered ferrite plate in other regions. Even when the ferrite sheet is bent, the continuity of the sintered ferrite plate is thus not lost and its decrease in magnetic permeability can be reduced.

In the embodiment, when the ferrite sheet 1 is bent, it is preferable to improve accuracy of the bending position and the ease of the bending. Thus, the groove 50 that is used as a starting point for bending the ferrite sheet 1 preferably has a depth reaching from the protective layer 40 at least one third of the thickness direction of the sintered ferrite plate 30. More preferably, the groove 50 has a depth reaching from the protective layer 40 to at least a middle portion of the sintered ferrite plate 30, that is, the one-half depth position of the sintered ferrite plate 30.

In another embodiment of the present disclosure, the ferrite sheet 1 is a ferrite sheet bent by using the groove 50 as a starting point. A portion bent by using the groove 50 as the starting point is preferably bent at a generally right angle. In that way, for example, when disposing along a corner portion of a metal member, a gap is less likely to be present between the ferrite sheet 1 and the metal member, so that the magnetic flux generated by a coil can be effectively concentrated into the ferrite sheet 1, thus good communication characteristics of an antenna and good charging efficiency of a non-contact power supply apparatus can be ensured. A desired shape, such as a box shape or a cylindrical shape, can be also formed, for example, by bending the ferrite sheet at multiple positions using the grooves 50 as starting points.

In yet another embodiment of the present disclosure, an antenna apparatus is provided which includes the foregoing ferrite sheet, and a coil provided on a surface of the ferrite sheet and including a conductive material. In the antenna apparatus, a substrate on which a loop coil is provided may be laminated on the ferrite sheet. Since the antenna apparatus includes the ferrite sheet that is easy to bend, as described above, the antenna apparatus can be easily bent without causing reduction of its characteristics, and applied in various shapes.

In yet another embodiment of the present disclosure, a non-contact power supply apparatus is provided which includes the foregoing ferrite sheet, and a coil provided on a surface of the ferrite sheet and including a conductive material. In the non-contact power supply apparatus, a substrate on which a loop coil is provided may be laminated on the ferrite sheet. Since the non-contact power supply apparatus allows magnetic flux generated by a coil to be effectively concentrated in the ferrite sheet as described above, good charging efficiency of the non-contact power supply apparatus can be ensured.

When the ferrite sheet has multiple faces by bending using the grooves as starting points in the antenna apparatus and the non-contact power supply apparatus including the ferrite sheet, the coil provided on the surface of the ferrite sheet and including a conductive material may be also disposed across the multiple faces of the ferrite sheet.

EXAMPLES

Examples are presented below for explaining in detail a ferrite sheet according to the present disclosure. In Examples, experiments were conducted for variations in magnetic permeability of the ferrite sheet bent at a generally right angle.

1. Preparation of Measuring Sample (Ring)

Ni—Zn-based ferrite sheets were prepared, each of which had a structure where a sintered ferrite plate having a thickness of 45 μm, 80 μm, or 100 μm was affixed to a substrate via an adhesive layer, a protective layer was provided on a surface of the sintered ferrite plate, and the sintered ferrite plate was previously split into small pieces. Each ferrite sheet was stamped using a die into a ring shape having an outer diameter of 19.9 mm and an inner diameter of 5.8 mm. Two types were then prepared, one of which was a working example with a groove formed in the ring-shaped sample using a laser for a depth reaching to about one-half of the sintered ferrite plate, and another of which was a comparative example with no groove formed. The groove had a linear shape in planar view to pass through the center of the ring.

2. Measurement of Magnetic Permeability (Before Bending)

Measurement of magnetic permeability was performed by using an impedance analyzer E4991A (Keysight Technologies). The ring-shaped sample was placed in a device fixture and its magnetic permeability was measured before bending.

3. Bending of Rings

The ring-shaped sample was removed from the device fixture and bent along a right angle on a metal fixture. The ring-shaped sample with the groove formed was bent at a right angle along the groove. The ring-shaped sample with no groove formed was bent at a right angle on a linear line passing through the center of the ring in planar view.

4. Measurement of Magnetic Permeability (after Bending)

The bent ring-shaped sample was placed unchanged in the device fixture and its magnetic permeability was measured after bending.

Results for the measurement of the magnetic permeability of the working examples 1 to 3 and the comparative examples 1 to 3 are shown in Table 1.

TABLE 1

| | Thickness of Sintered ferrite plate (μm) | μ' (Before bending) | μ' (After bending) | Δμ' (Subtracting "After" from "Before") | %Δμ' (Subtracting "After" from "Before") |
|---|---|---|---|---|---|
| Working example 1 | 45 | 193 | 188 | 5 | 2 |
| Working example 2 | 80 | 208 | 200 | 8 | 4 |
| Working example 3 | 100 | 198 | 184 | 15 | 7 |
| Comparative example 1 | 45 | 194 | 184 | 10 | 5 |
| Comparative example 2 | 80 | 211 | 194 | 17 | 8 |
| Comparative example 3 | 100 | 198 | 178 | 20 | 10 |

As shown in Table 1, it was revealed that the ferrite sheets of the working examples with the groove formed had smaller variations in the magnetic permeability before and after bending than the ferrite sheets of the comparative examples with no groove formed. It is thus considered that when the ferrite sheets of the working examples are used, variations in the magnetic permeability can be reduced even if the ferrite sheets are bent, and that in the case of applying to an antenna apparatus, good communication characteristics of the antenna apparatus can be ensured.

Therefore, the ferrite sheet according to the present disclosure is useful since the ferrite sheet can be easily bent at a desired position into a desired shape, and reduce the decrease in magnetic permeability caused by unintended cracks in the sintered ferrite plate during bending the ferrite sheet.

DESCRIPTION OF REFERENCE CHARACTERS

1 Ferrite sheet
10 Substrate
20 Adhesive layer

30 Sintered ferrite plate
40 Protective layer
50 Groove

What is claimed is:

1. A ferrite sheet comprising:

a substrate, a sintered ferrite plate provided on a surface of the substrate via an adhesive layer, and a protective layer provided on a surface of the sintered ferrite plate, wherein the protective layer includes at least one groove that extends to at least the sintered ferrite plate and does not extend to a face of the substrate not being in contact with the adhesive layer.

2. The ferrite sheet according to claim 1, wherein the groove extends to at least one third of a thickness of the sintered ferrite plate in a thickness direction.

3. The ferrite sheet according to claim 1, configured to be bent using the groove as a starting point.

4. The ferrite sheet according to claim 3, wherein a portion bent using the groove as the starting point is bent at a generally right angle.

5. An antenna apparatus, comprising:

a ferrite sheet according to claim 1, and a coil provided on a surface of the ferrite sheet and including a conductive material.

6. A non-contact power supply apparatus, comprising:

a ferrite sheet according to claim 1, and a coil provided on a surface of the ferrite sheet and including a conductive material.

7. A ferrite sheet comprising:

a substrate, a sintered ferrite plate provided on a surface of the substrate via an adhesive layer, and a protective layer provided on a surface of the sintered ferrite plate, wherein the protective layer includes at least one groove that extends to at least the sintered ferrite plate and does not extend to a face of the substrate not being in contact with the adhesive layer, wherein the sintered ferrite plate is divided into smaller pieces.

* * * * *